2,813,059
OLIGODYNAMIC SILVER TREATING PROCESS AND MICROBICIDAL PRODUCT

Fred W. Davis and Thomas A. Stokes, Jr., Lake Worth, Fla., assignors, by mesne assignments, to A. O. Edwards, Palm Beach, Fla.

No Drawing. Application November 12, 1954,
Serial No. 468,524

7 Claims. (Cl. 167—72)

This invention relates to a method and product useful in treating an article to render it microbicidal and to the treated article itself.

The treatment of articles, such as those made of synthetic organic plastic, paper, leather, textiles, felt and other fibrous and non-fibrous products, to impart microbicidal properties to them whereby they would be lethal over long periods of time to bacteria and fungi coming into contact with them has long presented a problem for which no entirely satisfactory process has heretofore been disclosed. It is known that such articles, especially paper, fabrics and other cellulosic fibrous articles, can be impregnated or treated with certain types of microbicidal agents to maintain them in a sterile condition for short periods of time. A number of conventional germicides and fungicides have been proposed for such purposes. Bandages supporting germicides on the fibers and in the interstices between the fibers have been prepared which could be stored in the open air without becoming unduly contaminated with microorganisms and which could be applied subsequently to open wounds without danger of carrying air-borne infections into the wound. Even this process has, however, not been entirely satisfactory for a number of reasons and has not been used on a wide scale.

Most of the attempts made heretofore to render articles microbicidal have been confined to the treatment of bandages, surgical gauze and similar fibrous articles for the reason that such articles must of necessity be maintained in a strictly sterile condition until such time as they are used. There are many other instances, however, where the provision of an article which has been treated in such a way as to render it more or less permanently toxic to bacteria and fungi coming into contact with its surface would be highly advantageous. Not only would a treatment whereby this could be accomplished easily and economically be of value in connection with health problems to prevent the spread of disease and the like by the handling of such articles by different persons, but the avoidance of the deteriorating and destructive effects of the microorganisms on the articles themselves leading to molding, mildew, decay and the like would be avoided. The large annual loss, in terms of money, of cellulosic and other products subject to decay from bactericidal or fungicidal causes is well known.

It is apparent that, to be of more than limited applicability in restricted fields, a process for treating articles to render them microbicidal must of necessity be such that the article retains its microbicidal properties as nearly permanently as possible. In particular, treated articles to be used out of doors should not lose their microbicidal properties by exposure to sunlight, rain and other weather conditions. Articles which must be cleaned and laundered frequently should not lose their microbicidal properties during cleaning or laundering. In addition, there are certain aspects relating to the appearance of the treated article which must be taken into account. Any treatment which changes the color or weight of the article, e. g., of a fabric or paper, or which otherwise alters its appearance would obviously be unsatisfactory in many instances. Not only should the appearance of the article suffer as little change as possible during the actual treatment, but any subsequent change in appearance even after long storage or use should be avoided as much as possible. Odorous substances cannot be tolerated in a majority of instances. It is thus apparent that the problem involved is highly complex and that a simple, inexpensive method for accomplishing the purposes outlined, while at the same time avoiding in great measure the difficulties mentioned, is not to be found readily.

The many attempts which have been made to accomplish the desirable results referred to are known in the art and need not be reviewed here. In particular, however, attention is directed to the numerous attempts which have been made to utilize silver compounds in the treatment of articles to give them microbicidal properties, especially bactericidal properties. The effective bactericidal properties and the generally non-corrosive nature of many types of silver compounds would indicate that these substances should find utility in this field. Little success has been attained, however, in this utilization of silver compounds because of their almost universal property of becoming colored when exposed to light over a period of time. White fabrics, for example, treated or impregnated with silver salts by most of the known methods acquire a greyish, bluish or even a darker shade of color after exposure to the light. Most colored articles when so treated suffer a distinct change in shade upon exposure to light. Such shades are often particularly displeasing to the eye and, of course, no change in color can be tolerated when a permanently uncolored article is desired.

It has been proposed in one method for utilizing silver compounds for the purposes outlined to co-precipitate a substantially water-insoluble silver salt, such as the chloride or phosphate, with another substantially water-insoluble salt, such as barium sulfate, magnesium phosphate and the like, which appear to provide a medium or screen for absorption of light rays to protect or shield the actual silver salt from the light and thus to prevent in large measure its discoloration. Although it appears that this process will accomplish the desired result to at least a limited extent, it is apparent that the co-precipitation with the silver salt of another salt, which must generally be present in the co-precipitate in an amount many times that of the silver salt, cannot but add to the cost of the process. It is also apparent that the more material which is deposited on an article, e. g., on a fabric, the more the physical properties of the treated product will differ from those of the untreated product. Even though the co-precipitation process thus referred to has many advantages over other processes heretofore described for treating fibrous and non-fibrous articles to render them microbicidal, it is apparent that even this process leaves much to be desired in the way of cost of operation and application and, more particularly, in the way of reducing to as low a value as possible or of eliminating entirely the amount of material which must be deposited along with the silver salt on the surfaces of the article.

It has now been found, unexpectedly, that certain substantially water-insoluble silver compounds can be precipitated in essentially pure form without the accompanying precipitation of light screening compounds directly on the surfaces of fibrous and other articles by the method hereinafter described in such a way that the deposit of the silver compound adheres tenaciously to the surface where it exerts a highly germicidal effect against organisms coming in contact with the surface. Furthermore, when the process is carried out as herein disclosed, the deposit is not removed or its germicidal effectiveness lessened appreciably by repeated laundering and cleaning and the treated article shows no tendency to become discolored even after long exposure to direct sunlight. It is characteristic of the process that these advantageous results are attained by proper control of the conditions under which the deposition of the silver compound is carried out and that they are not dependent upon the presence on the surfaces of another compound co-precipitated along with the silver compound. The new process, together with the composition of matter used in the process as well as the treated article having the characteristics hereinafter set forth, have not been described previously.

The process of the invention comprises wetting the surfaces of the article which is to be treated, e. g., by spraying, dipping, padding, or the like, so that its surfaces, including the surfaces of the individual fibers of fibrous articles, are wetted thoroughly with the new aqueous composition containing a silver compound and certain other essential ingredients and, after removing any undesired excess of the composition, drying or otherwise treating the wetted article to effect the deposition of the desired silver compound in a condition wherein it is light-stable, laundry-resistant and highly effective germicidally.

The new composition which is employed in the process is characterized by being an aqueous solution comprising a silver compound, an excess of a water-soluble basic nitrogen compound over the amount required to form complex cations with all of the silver in the solution and, in addition, a compound or substance furnishing anions of a sparingly water-soluble silver salt, the anions also generally being present in the solution in an excess over an amount chemically equivalent to the silver in the solution. As an example, but not by way of limitation, one preferred solution contains silver nitrate dissolved in an aqueous solution containing a considerable excess of ammonia over that required to form the ammino compound and sodium chloride, the amount of chloride ion being present in considerable excess over that chemically equivalent to the silver. It is a further characteristic of the solution that its pH is sufficiently high, because of the excess of the basic nitrogen compound present, that the precipitation of the sparingly water-soluble silver salt is prevented entirely, none of the silver in the composition being present in insoluble form at the time the article being treated is wetted with the solution.

The aqueous solution used in the process can be made up in any convenient manner. Generally speaking, the silver compound which is used and the basic nitrogen compound are dissolved in water to form a clear aqueous solution and the compound furnishing the anions of the sparingly water-soluble silver salt then added either with or without being previously dissolved in water. The clear solution thus obtained is subsequently used for wetting the surfaces of the article which is to be treated.

The silver salt which is used in making up the treating solution can, insofar as is known, comprise any silver salt or mixture thereof which is soluble in an aqueous solution of the particular basic nitrogen compound employed. Examples of highly water-soluble silver salts which can be used include silver nitrate, silver perchlorate, silver fluoride and the like. Silver salts which are somewhat less soluble in water than those just mentioned, but which are soluble in aqueous solutions containing an excess of the basic nitrogen compound, include silver sulfate, silver propionate, silver acetate, silver chlorate and the like. Silver salts which are highly insoluble in water but which are, nevertheless, soluble in aqueous solutions containing an excess of the basic nitrogen compound include silver chloride, silver bromide, silver phosphate, silver cyanide, silver thiocyanate, silver benzoate, silver carbonate, silver citrate and others. The property of most silver salts of forming complex silver ammino cations with basic nitrogen compounds is well known and need not be elaborated upon here, other than to point out the large variety of water-soluble and water-insoluble silver compounds which can be employed in making up the solution.

A wide variety of basic nitrogen compounds are suitable for inclusion in the treating solution. The preferred basic nitrogen compound is selected from the group consisting of ammonia and the water-soluble aliphatic amines. Aliphatic amines which are satisfactory include methyl amine, diethyl amine, triethyl amine, hexyl amine and the like. Insofar as is known, any water-soluble aliphatic primary, secondary or tertiary aliphatic amine can be used, especially those having alkyl radicals with not more than six carbon atoms in the radical. The invention is not limited, however, to the use of ammonia or an aliphatic amine, but contemplates the use of any basic nitrogen compound which provides for the preparation of a clear, stable solution which does not reduce or react otherwise with the silver compound and which can be removed readily later in the process. For economic and other reasons, the basic nitrogen compound employed is generally ammonia. It appears that somewhat better light stability of the treated product is often obtained more readily using the preferred ammonia or a water-soluble aliphatic amine than when using certain other amines, the reason for which is not entirely clear.

A third essential ingredient employed in making up the treating solution is a compound which, as noted previously, furnishes anions of a sparingly water-soluble silver compound. It is not readily possible to define accurately the anions thus furnished in terms of the degree of solubility of the sparingly water-soluble silver compound deposited on the article because of the many other factors which influence to a greater or lesser degree the suitability of the compound. It has been noted, however, that silver sulfide, which is soluble in water to the extent of about 0.00002 percent by weight, appears to be insufficiently soluble to exert any appreciable bactericidal effect. On the other hand, the solubility of silver sulfate, which is soluble in water to the extent of about 0.5 percent, appears to be such that if this compound is deposited on the surfaces of the article, it is readily removed by leaching after a few launderings or washings with hot water. For these reasons, the sparingly water-soluble silver compound which is deposited on the surfaces of the article is herein defined as a compound having a solubility in water greater than about that of silver sulfide but less than about that of silver sulfate. It also appears that there is some correlation between the actual solubility in water of the compound deposited and its light sensitivity, the more soluble compounds within the range given, such as silver orthophosphate, being somewhat more prone to become discolored by light than the less soluble compounds, such as silver chloride, even though there is little, if any, difference in germicidal effectiveness imparted to the treated article. For these reasons, and also for economic reasons, the preferred compound which is deposited when a high degree of color stability is desired is silver chloride or silver bromide. Of these two, the chloride is generally preferred, both because of its lower cost and because of the fact that the bromide is normally yellowish in color.

It is apparent that the anion-furnishing compound which is employed in the solution to furnish the anion of the sparingly water-soluble silver salt is governed entirely by the particular silver salt which it is desired to deposit on the article. The compound furnishing the chloride, bromide or other anion in the solution can be any relatively inexpensive and easily obtainable inorganic salt which furnishes the desired anion. Suitable salts include the chlorides and bromides of calcium, magnesium, strontium, barium, sodium, potassium, ammonium, and the like. The chlorides and bromides of the heavy metals which are soluble in aqueous ammonia and in other suitable aqueous basic nitrogen compounds can also be employed, if desired, although these are not generally particularly suitable except in the case of zinc, because of their more costly nature and because they are themselves often highly colored, at least when dissolved in such solutions. The use of an ammonium salt, e. g., ammonium chloride or ammonium bromide, to furnish the desired anion is often advantageous because its use tends to depress the formation of ammonium ions from the free ammonia when the latter is used and this is of value in certain instances. When complete freedom from development of color of the treated article is of minor importance, compounds, soluble in the solution, which furnish the phosphate, acetate, silicate, silicofluoride and other comparable anions of silver salts of the desired solubility range can be employed.

It should be pointed out that the nature of the treating solution is such that it can be prepared using water, the basic nitrogen compound and a single compound which furnishes both the silver and the anion of the sparingly water-soluble silver salt, e. g., by employing the sparingly water-soluble silver salt it self. Thus, as is known, silver chloride and silver bromide are both soluble in aqueous solutions of basic nitrogen compounds, e. g., in aqueous ammonia, to furnish solutions containing chloride or bromide anions and complex silver ammino cations. It should be pointed out, however, that when such a silver salt is employed in making up a solution it is essential that an additional compound, such as sodium or ammonium chloride, also be included in the solution to furnish the excess of anions of the sparingly water-soluble silver salt which is essential in the satisfactory operation of the process. As indicated previously, considerable excess of the basic nitrogen compound is essential in the solution even when using silver chloride or other sparingly water-soluble silver salt as the starting material to insure proper operation of the process.

The proportions of the several ingredients used in making up the treating solution can be varied, depending upon the particular silver salt which is to be deposited upon the surfaces of the article and upon the particular basic nitrogen compound employed. It appears, also, that the proportion of the basic nitrogen compound and of the anion of the sparingly water-soluble silver salt with respect to the proportion of silver in the solution is also dependent, at least to some extent upon the actual concentration of the silver in the solution. Thus, it has been found that when depositing silver chloride from an ammoniacal solution containing 0.00189 mol per liter of dissolved silver and 0.0032 mol per liter of the disodium salt of bis-(5-chloro-2-hydroxyphenyl)-methane as a fungicide, according to a modification to be explained later, it is essential, to insure that color does not develop in the treated article, for the solution to also contain more than 43 mols of ammonia and more than about 2.25 mols of chloride ion for each mol of silver in the solution. When the proportion of either of these substances is below the critical value given, the treated article is prone to become colored upon exposure to sunlight regardless of the proportion of the other of the substances in the solution. On the other hand, it has been observed that when the sparingly water-soluble silver salt to be deposited is silver bromide, the proportion of ammonia in the solution must be increased by four or five times over that necessary when silver chloride is to be deposited, to prevent precipitation of silver bromide in the treating solution. However, it does not appear that a correspondingly great increase in the proportion of bromide ion over chloride ion is necessary in this instance, although some increase does appear to be helpful. For these reasons, it is difficult to define accurately and quantitatively the proportions, with respect to the silver in the solution, of the basic nitrogen compound and of the anion of the sparingly water-soluble silver salt which must be maintained in the solution in all cases.

It has been observed, further, that the proportion of basic nitrogen compound which it is necessary to include in the treating solution can sometimes be judged by observing the pH of the solution. Thus, when one mixture was made up comprising silver nitrate, sodium chloride and only sufficient ammonia to raise its pH to 8.5, the silver was present almost entirely in insoluble form. When the proportion of ammonia was increased so that the mixture had a pH of 9.0, the majority of the silver was present as the insoluble chloride, not more than about 10 percent of the silver appearing to be present in soluble form. When, however, the proportion of ammonia is sufficiently great, the solution is not only clear and devoid of precipitated silver chloride, but it can be used satisfactorily and without the treated article becoming colored upon exposure to light. The minimum pH value appears to be characteristic of the particular treating solution employed and to depend upon the particular sparingly water-soluble silver salt which is to be deposited, the particular basic nitrogen compound employed, the nature of other components which may be present in the solution and the actual concentrations of the several ingredients of the solution. Ingredients other than the silver sometimes necessitate the employment of a higher pH than does the silver itself. The temperature of the solution is also doubtless a factor.

In general, it appears that the proportion of basic nitrogen compound and of the anion of the sparingly water-soluble silver salt which must be present in the solution when the development of color of a treated article is to be prevented can best be expressed for all cases by stating that the anion of the sparingly water-soluble silver salt must be present in an excess over that required to precipitate all of the silver from neutral aqueous solution and that the basic nitrogen compound must be present in a proportion at least more than sufficient to prevent the precipitation of the sparingly water-soluble silver salt from the treating solution. When less than these critical proportions of these substances are present, the treated article invariably develops color upon exposure to light. It should be noted that it is not sufficient, to prevent color of the treated article, to have merely enough basic nitrogen compound present to keep the silver in solution but that an excess over this amount is necessary. On the other hand, when the development of color is not a factor, a lesser proportion of basic nitrogen compound can be employed without sacrifice of microbicidal properties of the treated article.

Inasmuch as the treating solution used in the process should be clear and free of suspended solids, it should also be mentioned that some care should be exercised in choosing the particular substances used to avoid the formation of compounds other than silver compounds which may be insoluble in the solution. Thus, if the silver salt employed is silver sulfate and the anion-furnishing compound employed is barium chloride, barium sulfate will be precipitated even though the solution contains the essential components in dissolved form. In some instances, the presence of such an extraneous precipitated product may not be particularly disadvantageous and, if desired, such a mixture can be filtered to remove suspended solids and the filtrate used in carrying out the process. However, such conditions and procedures are preferably avoided in the interest of simplification of the process.

The article which is to be treated is, as mentioned previously, wetted with the solution whose composition has been described. Wetting of the article can be carried out in any convenient manner, such as those mentioned previously. The amount of solution which is retained by the article will, of course, depend upon the character of the article and the method of application of the solution and this, together with the proportion of silver compound which it is desired to retain on the article, will in turn determine to a large extent the actual concentrations of the several ingredients in the treating solution. Many fibrous articles, such as cellulosic fabrics, paper and the like, can often be treated by proper wetting and wringing or squeezing procedures so that they will retain from as low as 25% or less to as high as 100% or 200%, or even more, of their own weight of solution. When the solution is applied by spraying or padding, the amount of solution which is applied and retained can be regulated to as small a proportion as desired. Articles having relatively non-absorbent surfaces can, of course, be treated satisfactorily with less solution and less actual silver, compared to the weight of the article, than can highly absorbent articles.

Generally speaking, the concentration and application of the solution are generally regulated so that the wet treated article, if a cellulosic fibrous article, contains from about 0.002% to about 0.1% of its dry weight of the sparingly water-soluble silver compound, although higher or lower proportions than these can be employed, if desired. These preferred values are not to be construed as limiting because it is apparent that in circumstances where the treated article is not to be subjected to conditions particularly favorable to the development of bacterial populations, the actual amount of silver salt can be reduced over that which is required under other conditions more favorable to the growth of bacteria. On the other hand, it is apparent that any excess of silver salt deposited on the article over that required to give the desired protective effect is to be avoided in the interest of economy.

Following the wetting of the surfaces of the article with the solution and any subsequent wringing or squeezing operations which are desirable, the wetted article is treated in any suitable manner to remove the basic nitrogen compound and, generally, the water. This is conveniently accomplished by simply drying the wet article, especially when ammonia or a lower-boiling aliphatic amine is employed as the basic nitrogen compound. Under such conditions, the sparingly water-soluble silver salt is deposited on the surfaces of the article in a highly adherent, light-resistant and bactericidally active condition. The dried article can then be washed with water to remove any water-soluble salts remaining from the treatment, e. g., the excess of the anion-furnishing compound, and then dried again. Alternatively, the basic nitrogen compound can be neutralized, e. g., with an acid non-harmful to the article, and the article then washed either with or without prior drying. The washing can, of course, be omitted when the presence of such soluble salts as may remain after the treatment is not undesirable. Insofar as is known, no particular precaution to exclude light or air need be observed in carrying out any step of the process. The drying temperature employed to remove the basic nitrogen compound can also be varied over wide limits including those generally encountered in the preparation and treating of fabric, paper and other fibrous articles.

It is known that silver salts have a certain degree of fungicidal value, especially against certain types of fungi. It is thus possible in employing the process of the invention to produce treated products which are not only bactericidal but which are also fungicidal to a marked degree. This often requires the deposition on the article of a greater proportion of the sparingly water-soluble silver salt than would otherwise be necessary if only bactericidal effects were desired. In view of the cost of silver and its compounds, this is not always desirable and, furthermore, fungicidal properties of the sparingly water-soluble silver salts are such that adequate protection against all types of fungi under the conditions most favorable for their growth may not always be obtained. For this reason, a preferred modification of the process comprises inclusion in the treating solution previously described of a fungicidal compound which is soluble therein and which, during the operation of the process as previously described, leads to the deposition on the surfaces of the article, along with the silver, of a sparingly water-soluble substance having fungicidal properties. As will be apparent hereinafter, the fungicidal substance deposited may be chemically combined with a part or all of the silver or it may merely be deposited along with, and in addition to, the sparingly water-soluble silver compound.

In a preferred modification, the fungicidal compound incorporated in the treating solution is one which furnishes fungicidal organic anions. Such a compound can be added in an amount greater or less, on a chemically equivalent basis, than the amount of silver compound in the solution as may be required for optimum results. The compound furnishing fungicidal organic anions is generally used in addition to the previously described requisite amount of compound furnishing the halide or other inorganic anions of the sparingly water-soluble silver compound. In certain instances, the proportion of the latter can be reduced to a limited extent when a compound furnishing fungicidal organic anions is included in the solution, but such possible reduction is not generally significant.

Although the exact nature of the deposit obtained on the article when a compound furnishing fungicidal organic anions is included in the treating composition is not known with certainty, it appears that at least a part of the fungicidal anions which are retained on the surfaces of the article are sometimes in the form of a silver salt containing the anions. However, it does not appear that all of the silver in the deposit is generally present in this form, even when the amount of fungicidal organic anions retained on the article is equal to or greater than the amount chemically equivalent to the silver retained. It may be that, when using a compound furnishing fungicidal organic anions in the solution, an equilibrium is established, insofar as the deposit is concerned, between a silver compound containing the fungicidal anions and the sparingly water-soluble silver compound previously referred to, e. g., silver chloride, and that the deposit consists of a mixture of the two compounds. Under such conditions, the proportions of the two compounds in the deposited mixture depend, of course, upon a number of factors, including the relative solubilities of the two and the rates of change of their solubilities in solutions of decreasing basic nitrogen compound content, e. g., during the drying step, as well as upon the actual ionic concentrations prevailing in the treating solution. Regardless of theory, the preferred modification leads to the production of a treated article which is both highly bactericidal and highly fungicidal. Generally speaking, the fungicidal qualities of the treated product are somewhat more easily destroyed by repeated washing and laundering than are the bactericidal qualities but they are, nevertheless, adequate for most purposes.

Fungicidal compounds which can be included in the solution for the purpose of furnishing sparingly water-soluble compounds having fungicidal organic anions include compounds, e. g., salts, of fungicidal organic acids and of fungicidal phenols and halo-phenols which are soluble in the solution. Compounds of fungicidal organic acids which can be employed include compounds of benzoic, salicylic, propionic, caproic, caprylic, pelargonic, undecylenic, hexanoic, sorbic and many other acids. Preferred compounds of fungicidal acids are the alkali metal and the basic nitrogen compound salts of the saturated and unsaturated aliphatic acids, particularly of undecylenic acid. Compounds of phenols and halo-phenols which can be employed are the sodium, potassium, lithium and basic nitrogen compound salts of such phenolic substances as the mono- and poly-chlorophenols, the phenylphenols and their halogen substitution products, the hydroxy- and halo-hydroxydiphenylmethanes, thiophenols and the like. Because of their ready availability and ease of handling in the process, the sodium and other alkali metal salts of bis-(5-chloro-2-hydroxyphenyl)-methane, bis-(2-hydroxy-3,5-dichlorophenyl)-sulfide and related halophenols and halothiophenols are of particular value in the operation of the process. This preferred modification of the invention in its broadest aspect, however, includes the employment in the treating solution of substantially any compound furnishing a sparingly water-soluble compound comprising fungicidal organic anions when the basic nitrogen compound is removed as described previously.

The manipulative procedure employed in carrying out the process when a compound furnishing fungicidal organic anions is employed in the solution does not vary appreciably from the procedure employed when such a compound is not employed. Because of the generally somewhat lower degree of stability of the compounds in the deposit containing the fungicidal organic anions, as compared with the stability of the sparingly water-soluble silver compound, it is generally desirable to avoid drying operations wherein the treated product is heated above about 150° C. to avoid volatilization of compounds containing an appreciable proportion of the fungicidal organic anions.

Another modification of the invention comprises the inclusion in the treating solution described previously of a soluble zinc salt, such as zinc chloride, zinc sulfate, zinc nitrate and the like. When such a zinc salt is included in the treating solution and the process carried out as described, a certain proportion, at least, of the zinc is deposited on the treated article during the drying operation in insoluble form, e. g., as zinc oxide, along with the silver compound. It has been observed that the presence on the treated article of such a zinc compound reduces to a considerable degree the tendency of the surface of the treated article to become darkened or blackened upon exposure to sulfide and other sulfurous fumes. It may be that this is because zinc sulfide, which is light in color, is formed more readily under such conditions than is silver sulfide. Generally speaking, the zinc salt is included in the treating solution in an amount not more than about one chemical equivalent for each chemical equivalent of silver in the solution, usually in a somewhat lesser amount, although the invention is not limited in this respect. It is apparent that if the anion of the zinc salt employed is the anion of a sparingly water-soluble silver salt, the amount of other compounds employed to furnish the required excess of this same anion can be reduced correspondingly. It is also apparent that if the zinc and the fungicidal anions can react to form a sparingly water-soluble compound, the latter may be present to some extent in the deposit on the surfaces of the treated article. It is known that many zinc compounds are of some value as fungicides and the presence of zinc compounds in the deposit may contribute somewhat to the fungicidal effectiveness of the treated article.

Various other substances can also be incorporated in the treating solution, if desired, to facilitate the operation of the process or to accomplish additional desired effects. Such substances include wetting agents, detergents, bleaching agents and the like which are compatible with the other constituents of the solution.

As pointed out previously, the invention is concerned not only with the process and the treating solutions or compositions described, but also with the treated product which results from the operation of the new process using the new treating composition. The new treated product produced is characterized by having deposited on its surfaces as a tightly adherent film or coating a sparingly water-soluble silver salt in a form such that it not only is highly toxic to microorganisms coming in contact with the surface of the article but such that it is stable when exposed to light and does not discolor even when exposed for long periods of time to direct sunlight. This is in direct opposition to the ordinary behavior of silver salts. This effect is accomplished without the deposition, along with the silver compound, on the surfaces of the article of a compound of another metal for the purposes of protecting the silver compound from the action of light. The amount of sparingly water-soluble salt deposited per unit area of surface is so small that the article is substantially unaffected in appearance or physical properties. As stated previously, the treated article can be laundered repeatedly with hot soap solution without decreasing significantly its microbicidal effectiveness.

Although the reason for this unexpected result is not entirely clear, it is pointed out that the treated product has not been described heretofore since the heretofore described methods for depositing a silver salt on the surfaces of an article invariably lead to products which become discolored upon exposure to light, as would be expected from the presence on their surfaces of a normally light-sensitive silver salt, unless drastic means distinguishing the product from the product of the present invention are taken to prevent it. It should be noted that the treated product of the invention can be prepared with the sole sparingly soluble substance remaining on its surfaces being the sparingly water-soluble silver salt without any tendency for the article to become discolored, provided the new method of the invention is followed and the new treating solution of the invention is employed. It may be that the effect observed, especially when cellulosic fibrous substances are treated, may be due at least in part to an affinity of the fibers for a silver-containing component of the solution comparable in some respects to the substantative dye-stuffs.

This effect is all the more remarkable in view of the disclosure contained herein that fungicides of the character described can be incorporated in the treating solution and the treated product, which is both highly bactericidal and highly fungicidal, prepared without sacrifice of the resistance of the article to discoloration upon exposure to light. The fungicides employed are, in most instances, organic in nature. The accelerating effect of organic matter on the discoloration of silver salts by light under ordinary circumstances is well known. However, even this effect is overcome by the herein described invention.

Certain advantages of the invention are apparent from the following examples, which are given by way of illustration only and are not to be construed as limiting.

In the accompanying examples the bactericidal and fungicidal effectiveness of the treated specimens of paper or fabrics were determined by a modified agar plate method. In the method a circular test disk precisely 15 millimeters in diameter was cut from the treated sheet of paper or fabric and placed flat in contact with the surface of a sterile agar plate freshly inoculated on its surface with the test organism. After incubation, the plate was inspected. The presence of a narrow ring around the test disk free of growing organisms was interpreted as showing the toxicity of the treated disk to the organism involved. In view of the essentially insoluble nature of the microbicidal substance on the test disk, its diffusion into the agar was in all cases limited and the actual width of the ring around the disk was of little significance. When an actual measurement was recorded, it was that of the total diameter of the ring, including the 15 millimeter diameter of the test disk.

EXAMPLE 1

A clear aqueous stock solution was prepared consisting of 10 grams of crystalline silver nitrate, 15.5 milliliters of 28% aqueous ammonia and sufficient water to make 250 milliliters. The solution contained 0.000236 mol of silver, calculated as the nitrate, and 0.00091 mol of total ammonia per milliliter.

A dipping bath was prepared by mixing 8 milliliters of the stock silver solution, 20 milliliters of 28% aqueous ammonia and 10 milliliters of an aqueous solution containing 100 grams of sodium chloride per liter with sufficient water to make 1 liter. The solution thus prepared had the following composition:

| | Percent by weight | Moles per liter |
|---|---|---|
| Silver (calculated as silver nitrate) | 0.032 | 0.00189 |
| Ammonia (total) | 0.516 | 0.30328 |
| Sodium chloride | 0.1 | 0.0171 |

A sheet of a good grade of white sulfite bond paper was immersed in the dipping solution for about 10 seconds. The sheet was then removed, squeezed between glass rollers to remove excess liquid and hung on a line to dry. The paper retained roughly 25% of its weight of solution after squeezing. The dried sheet was unchanged in color when compared with an untreated sheet and no discoloration of the dried sheet developed when it was exposed to direct sunlight and air for an extended period of time. The sheet was found to be bactericidal when tested by the method given previously.

EXAMPLE 2

A dipping solution was prepared identical with the dipping solution of Example 1 except that it also contained 1 gram (0.0032 mol) or 0.1% of the disodium salt of bis-(5-chloro-2-hydroxyphenyl)-methane. Paper and white fabric were treated with this dipping solution and tested for microbicidal properties according to the methods given. Both the treated paper and fabric were germicidal and fungicidal.

EXAMPLE 3

A number of dipping solutions were prepared following the general procedure of Example 2 and designated as A to L, inclusive. The amounts of silver and of the disodium salt of bis-(5-chloro-2-hydroxyphenyl)-methane were kept constant in the several solutions but the proportions of ammonia and sodium chloride were varied. The compositions in mols per liter of the solutions thus prepared are given in the accompanying Table 1. The solution of Example 2 is included in the table as No. E for comparative purposes.

Each of the solutions A to L, inclusive, was used for treating paper by dipping according to the procedure of Example 1 and the treated paper was exposed for several hours to direct sunlight and the presence or absence of color on the exposed specimen after several hours exposure was noted. This data is given in the last column of Table 1.

Each of the treated papers was tested according to the procedure given previously for germicidal effectiveness against *S. aureus* and *E. coli*, the total diameter of the ring of no bacterial growth being nited in each case. The data obtained is given in the second and third from the last columns of Table 1.

The ratios of the number of mols of ammonia and of sodium chloride to the number of mols of silver in each solution were calculated. These ratios are also listed in Table 1.

The tabulated data was inspected and it was noted that there were critical values for both the molar proportion of ammonia to silver compound and for the molar proportion of sodium chloride to silver compound in the solution below which the treated paper developed color upon exposure to sunlight but above which no color in the treated paper developed.

The inspection showed that for the complete prevention of the development of color in the treated paper upon exposure to sunlight it was necessary in this instance that the dipping solution contain more than 43 mols of ammonia and more than 2.26 mols of sodium chloride for each mol of silver compound in the solution. The inspection showed further that when either one of these ratios was reduced to the value given, color developed in the specimen even though the other ratio was not reduced to the value given for it. It was also noted that the bactericidal value of the treated paper was not reduced even though the proportions of ammonia or of sodium chloride were so low as to cause the development of color upon exposure of the treated paper to light.

It was noted, further, that the critical proportion of more than 43 mols of ammonia for each mol of silver compound in the solution necessary to prevent color in the treated paper was far above the proportion of ammonia necessary to prevent the precipitation of silver chloride.

The fungicidal value of the treated paper was high in each case although this data is not listed in Table 1 because of the constant concentration of the fungicide in all of the solutions.

EXAMPLE 4

The procedure of Example 1 was repeated except that the silver nitrate was replaced with an approximately chemically equivalent quantity of silver chloride, the proportion of chloride ion in the dipping bath being thus increased accordingly. Results entirely analogous to those obtained in Example 1 were obtained both as regards color development and bactericidal properties of the treated paper.

EXAMPLE 5

Example 1 was repeated except that the 20 milliliters of ammonia was replaced with 30.9 milliliters of ordinary aqueous diethylamine. Results entirely analogous to those of Example 1 were obtained.

EXAMPLE 6

The procedure of Example 1 was repeated except that the 0.0171 mol of sodium chloride was replaced with 0.0146 mol of sodium bromide. In this instance, also, 100 milliliters of 28% aqueous ammonia (1.48) mols) were used instead of the 20 milliliters (0.296 mol) as used in Example 1 to prevent the precipitation of silver bromide in the dipping solution. The results obtained were entirely analogous to those of Example 1 except that the treated paper was slightly yellowish due to the presence

*Table 1*

Effect of varying molar ratios of ammonia and sodium chloride in dipping solution made with silver nitrate, ammonia, sodium chloride and the disodium salt of bis-(5-chloro-2-hydroxyphenyl)-methane (Na-G4) as a fungicide]

| Solution No. | Composition (mols/liter) | | | | Molar ratios | | Bactericidal effectiveness (Diam. in mm.) | | Discoloration of treated paper |
|---|---|---|---|---|---|---|---|---|---|
| | silver compound | Ammonia (total) | sodium chloride | Na-G4 | NH₃ (total) Ag | NaCl, Ag | *S. aureus* | *E. coli* | |
| A | 0.00189 | 0.30328 | 0.0513 | 0.0032 | 160 | 27.15 | 18.5 | 31 | No. |
| B | 0.00189 | 0.30328 | 0.0427 | 0.0032 | 160 | 22.60 | 20.5 | 17.5 | No. |
| C | 0.00189 | 0.30328 | 0.0342 | 0.0032 | 160 | 18.08 | 19.5 | 17.0 | No. |
| D | 0.00189 | 0.30328 | 0.0256 | 0.0032 | 160 | 13.56 | 20.0 | 17.5 | No. |
| E | 0.00189 | 0.30328 | 0.0171 | 0.0032 | 160 | 9.04 | 20.5 | 18.0 | No. |
| F | 0.00189 | 0.30328 | 0.00855 | 0.0032 | 160 | 4.52 | 21.0 | 17.0 | No. |
| G | 0.00189 | 0.30328 | 0.00427 | 0.0032 | 160 | 2.26 | 20.5 | 18.0 | Yes. |
| H | 0.00189 | 0.30328 | 0.00171 | 0.0032 | 160 | 0.90 | 20.5 | 18.0 | Yes. |
| I | 0.00189 | 0.22928 | 0.00855 | 0.0032 | 121 | 4.52 | 20.5 | 17.5 | No. |
| J | 0.00189 | 0.15528 | 0.00855 | 0.0032 | 82 | 4.52 | 19.5 | 18.0 | No. |
| K | 0.00189 | 0.08128 | 0.00855 | 0.0032 | 43 | 4.52 | 20.0 | 18.0 | Yes. |
| L | 0.00189 | 0.04428 | 0.00855 | 0.0032 | 23.4 | 4.52 | 20.0 | 18.0 | Yes. | on its surfaces of silver bromide. The molar ratio of bromide to silver in the dipping solution was 7.73 and the molar ratio of ammonia to silver was 7.83.

The experiment was repeated except that the amount of sodium bromide in the solution was reduced to 0.0076 mol, the molar ratio of bromide to silver thus being 4.02. In this instance, the treated paper became discolored upon exposure to light.

EXAMPLE 7

The procedure of Example 1 was repeated except that the sodium chloride was replaced with 0.0085 mol of magnesium chloride, the molar ratio of chloride to silver being 4.5. The results obtained were substantially identical to those obtained in Example 1. Substitution of .00856 mol of calcium chloride for the magnesium chloride gave the same results with respect to color development and bactericidal effectiveness of the treated paper.

EXAMPLE 8

A clear aqueous dipping solution was prepared by dissolving together in water 0.00472 mol of silver nitrate, 0.740 mol of ammonia, 0.0053 mol of zinc nitrate, calculated as the anhydrous salt, 0.0214 mol of sodium chloride and 0.0032 mol of the disodium salt of bis-(5-chloro-2-hydroxyphenyl)-methane and diluting the solution to 1 liter with water. Samples of paper and fabric were dipped in the solution, squeezed to remove excess liquid, and dried. The samples did not discolor upon exposure to light and were both germicidal and fungicidal when tested according to the procedure given. The treated samples were less subject to discoloration by sulfide fumes than similarly treated samples prepared without a zinc salt in the treating solution.

EXAMPLE 9

A first solution was prepared containing 64.9 parts by weight of 29.4% aqueous ammonia (18.93 parts actual $NH_3$), 10.5 parts of undecylenic acid, 6.0 parts of zinc chloride, 0.05 part of a wetting agent (Igepal CO–630 available from Hart Products Corporation), 0.10 part of 35% hydrogen peroxide, and 18.45 parts of water.

A second solution was prepared consisting of 13.1 parts by weight of crystalline silver nitrate and 86.9 parts of water. These solutions were stored separately, without deterioration, for several days.

A padding solution was prepared by mixing 7.5 parts by weight of the first solution and 0.84 part of the second solution with 120 parts of water. The padding solution thus prepared was clear and free of sediment or precipitate. Each 100 grams of the solution contained 0.11 gram (0.0005 mol) of silver compound, 1.0 gram (0.059 mol) of actual ammonia, 0.352 gram (0.00259 mol) of zinc chloride and 0.585 gram (0.00318 mol) of undecylenic acid, calculated as the free acid. The molar ratio of ammonia to silver compound was 120 and the ratio of chloride ion to silver compound was 10.3.

A conventional pad box was charged with the padding solution and kept full by hand charging of additional solution as needed. A variety of styles of dry white and colored cotton fabrics were run through the pad box at a speed of about 60 yards per minute with the bath temperature at 120° F. The fabrics were then run through nip rolls and folded into tote boxes to await drying. The dryer was run at 230° F. and the drying time was approximately five minutes.

The retention of padding solution by the fabrics prior to drying varied from approximately 40% to approximately 65% of the dry weight of the fabric, depending largely upon the type of fabric treated. The finally dried fabrics thus retained from about 0.029 to about 0.046 percent of their weight of silver, calculated as the chloride. The bactericidal and fungicidal effectiveness and the light stability of the treated fabrics were excellent.

EXAMPLE 10

White cotton fabrics, treated by procedures representative of those of the foregoing examples, were washed in an automatic home washer with hot laundry soap solution using the washing and rinsing cycle recommended by the manufacturer of the washer. The rinsed fabrics were then hung on a line until thoroughly dry and then ironed with an electric hand iron. The ironed fabrics were then washed, rinsed, dried and ironed as before, the cycle being repeated for from fifteen to forty times in different tests. At the end of the tests, the fabrics remained unchanged in color and were still highly effective bactericidally and, in most instances, fungicidally.

Although the invention has been described with particular reference to cellulosic fabrics and paper, it is pointed out that it is concerned as well with the treatment of other cellulosic and non-cellulosic fibrous and non-fibrous articles and with the treated products which result. Thus, wood pulp can be treated by the process of the invention to protect it from deterioration during storage, the microbicidal activity of the fibers generally persisting through the paper-making process so that paper made from the treated pulp embodies desirable microbicidal features. Other cellulosic substances which can be treated similarly with advantageous results, either in bulk fibrous form or in the form of articles manufactured from the fibers include linen, hemp, jute and the like. Many synthetic fibers, such as rayon, acetate, nylon and the like, and articles fabricated therefrom, can also be treated by the process advantageously. Certain modifications of the process can be employed in treating wool and other fibrous substances of animal origin.

The invention is not confined to the treatment of fibrous substances but relates as well to the treatment of moderately porous and substantially non-porous articles to render their surfaces lethal to microorganisms coming in contact with them. Such articles includes those of wood, rubber, synthetic plastics and the like. Powdered materials such as pigments, dentifrice powders, talcum and dusting powders and many others can likewise be treated by the process to give products which, in addition to their normal function, exhibit effective germicidal and, if desired, fungicidal properties. By proper modifications of the process, it can be applied to the preparation of ointments, lotions and other semi-solid paste compositions.

We claim:

1. A process for depositing, on the surface of an article, a sparingly water-soluble silver salt to render said surface lethal to bacteria coming in contact therewith, which process consists of wettting the surface of said article with an aqueous solution having dissolved therein a silver salt, a water-soluble, volatile basic nitrogen compound a portion of which is combined with the silver of said silver salt to form complex silver ammino cations, and a second salt other than a silver salt which furnishes anions capable of forming a silver salt having a solubility in water from 0.00002 to 0.5% by weight, said anions being present in an amount in substantial excess of that required to precipitate all of the silver present in neutral solution, said nitrogen compound being present in an amount in substantial excess of that required to prevent precipitation of the sparingly water-soluble silver salt from the solution, and said solution being free of anions capable of combining with the cation of said second salt to form a sparingly water-soluble compound in addition to said sparingly water-soluble silver salt; and drying the article so-wetted to deposit the sparingly water-soluble silver salt on the surface in tightly adherent, bactericidally active form.

2. The process of claim 1 in which said basic nitrogen compound is ammonia.

3. The process of claim 1 in which said solution also contains a compound which furnishes a fungicidal organic anion selected from the group consisting of the anions of fungicidal organic acids, phenols and halophenols.

4. The process of claim 3 in which the fungicidal anion is the anion of undecylenic acid.

5. The process of claim 3 in which the fungicidal anion is the anion of bis-(5-chloro-2-hydroxyphenyl)-methane.

6. The process for depositing, on the surface of an article, a sparingly water-soluble silver salt to render said surface lethal to bacteria coming in contact therewith, which process consists of wetting the surface of said article with an aqueous solution having dissolved therein a silver salt, ammonia and a second salt other than a silver salt which furnishes chloride ions, the solution containing more than 43 mols of ammonia and more than about 2.26 chemical equivalents of chloride ions for each chemical equivalent of silver in the solution, said solution being free of anions capable of combining with the cation of said second salt to form a sparingly water-soluble compound in addition to said sparingly water-soluble silver salt; and drying the articles so-wetted to deposit silver chloride on the surface in tightly adherent bactericidally active form.

7. The product produced by the process of claim 1.

References Cited in the file of this patent

UNITED STATES PATENTS

| | | |
|---|---|---|
| 2,250,390 | Minaeff | July 22, 1941 |
| 2,459,896 | Schwarz | Jan. 25, 1949 |
| 2,653,893 | Romans | Sept. 29, 1953 |
| 2,689,809 | Fessler | Sept. 21, 1954 |

FOREIGN PATENTS

| | | |
|---|---|---|
| 515,540 | Great Britain | Dec. 7, 1939 |
| 543,948 | Great Britain | Mar. 20, 1942 |

OTHER REFERENCES

Reddish: Antiseptics, Disinfectants, Fungicides and Sterilization, Lea and Febiger, Phila., 1954, pp. 398–399.

Hackh: Chem. Dictionary, 3rd ed., 1944, p. 773, entry "S. Ammonium Chloride."

Marsh et al.: Ind. and Eng. Chem., July 1946, p. 703.